United States Patent [19]

Clarke

[11] 4,371,434

[45] Feb. 1, 1983

[54] DEGASSER-DEHYDRATOR

[75] Inventor: Eugene L. Clarke, Rome, Italy

[73] Assignee: Petrolite Corporation, St. Louis, Mo.

[21] Appl. No.: 276,404

[22] Filed: Jun. 22, 1981

[51] Int. Cl.³ .................... B01D 17/04; B01D 17/06; B01D 19/00

[52] U.S. Cl. ........................................ 204/302; 55/45; 55/178; 55/185; 210/218

[58] Field of Search .............. 204/302, 304, 307, 308, 204/164, 188, 186; 55/45, 164, 165, 201, 206, 178, 185; 210/218

[56] References Cited

U.S. PATENT DOCUMENTS 3,347,773 10/1967 Turner ........................ 204/302 X

*Primary Examiner*—G. L. Kaplan
*Assistant Examiner*—Nam X. Nguyen
*Attorney, Agent, or Firm*—Sidney B. Ring; Hyman F. Glass

[57] ABSTRACT

An apparatus for dehydrating and degassing oil-continuous emulsions containing gases and a dispersed aqueous phase comprising a treating vessel provided with a combined distributor-degasser having an inverted trough with orifices along the sides and with an upper peaked portion having a central upwardly directed opening; a demister in the central opening communicating with the trough; a defoamer in the peaked portion on each side of and communicating with the demister; means associated with the trough for communicating with liquid-gas interface level control means; and a gas outlet in the demister. The treating vessel is provided with emulsion inlet means communicating with the inverted trough, a gas outlet communicating with the demister, and water and treated oil outlets. The treating vessel is preferably provided with an electrode system and means for controlling the aqueous material level at a position between the distributor-degasser and the electrode system.

8 Claims, 7 Drawing Figures

DEGASSER-DEHYDRATOR

FIELD OF THE INVENTION

This invention relates to dehydrating and degassing oil-continuous emulsions containing gases and a dispersed aqueous phase, such as crude petroleum oils, although the invention can be used in the resolution of other emulsions, which term is used herein as including dispersions. More particularly, the invention relates to improved apparatus wherein degassing and dehydrating are carried out in the same vessel.

BACKGROUND OF THE INVENTION

Oil continuous emulsions containing gases and a dispersed aqueous phase are customarily degassed before being subjected to a dehydrating operation involving resolving the emulsion by electric field treatment. Such resolution involves introducing the emulsions directly into an electric field of sufficient intensity to coalesce the suspended droplets of the dispersed phase into masses of sufficient size to gravitate from the oil. Gas may form due to pressure drops, heating and other causes or may be initially present in the emulsion being treated. Removal of the gas is desirable to obviate problems caused by gas passing through the electrode area.

It is also known to mix a quantity of water with incoming crude oil so that a more complete removal of the salt from the oil may be accomplished during the dehydration operation.

It is further known to resolve and dehydrate emulsions without the use of an electric field.

More specifically, it is known to carry out degassing and resolving operations in separate side by side zones of a treating vessel. Such systems are shown in U.S. Pat. No. 3,207,686 to Howell R. Jarvis and William L. Shirley and U.S. Pat. No. 3,458,429 to Frederick D. Watson and Weldon D. Mayse. It is also known to provide a gas separation zone below the level of the emulsion resolving zone. This is shown in U.S. Pat. No. 3,347,773 to Delber W. Turner.

It is an object of this invention to provide an improved degassing-distributing system which will efficiently remove gas evolved in a system where crude oil is preheated and a pressure drop is created by a mixing valve in the operation of a dehydrating-desalting process. It is a further object of this invention to provide an improved dehydrating and degassing apparatus employing said improved degassing-distributing system.

Other objects of the invention will be evident to those skilled in the art in the course of the following description.

SUMMARY OF THE INVENTION

The above and other objects of the invention are achieved by providing a distributor-degasser of the type referred to comprising a horizontally elongated inverted trough having a lower portion with orifices along its sides and an upper peaked portion, the peaked portion having a central upwardly directed opening; demister means mounted in the central opening and communicating with the trough; defoamer means in the peaked portion of the inverted trough on each side of the demister means, the defoamer means communicating with the demister means; means associated with the trough for communicating with liquid-gas interface level control means; and gas outlet means in the demister means.

The novel dehydrating and degassing apparatus of this invention comprises a treating vessel provided with emulsion inlet means; water, gas and treated oil outlet means; and also with a distributor-degasser as above described, the distributor-degasser being positioned in the lower portion of the vessel. The vessel emulsion inlet means communicates with the lower portion of the inverted trough, above the orifices, of the distributor-degasser and the vessel gas outlet means communicates with the demister means.

The treating vessel is preferably also provided with an electrode system and conductive means associated therewith, such electrode system being adapted to produce an electric treating field, and preferably positioned horizontally in and extending across the entire horizontal cross-section of the treating vessel. In apparatus of this type, the distributor-degasser is preferably positioned below the electrode system and the treating vessel is further provided with means for controlling the level of aqueous material therein at a position intermediate the distributor-degasser and the electrode system.

The electrode system preferably comprises two planar permeable electrodes in vertically spaced relationship, of which the upper electrode is grounded and the lower electrode is adapted to be energized.

The treating vessel is preferably in the form of a horizontally elongated cylinder in which the treated oil outlet means includes collector means positioned in the upper part of the treating vessel.

SHORT DESCRIPTION OF THE DRAWINGS

DESCRIPTION OF SPECIFIC EMBODIMENT

Figure 1:
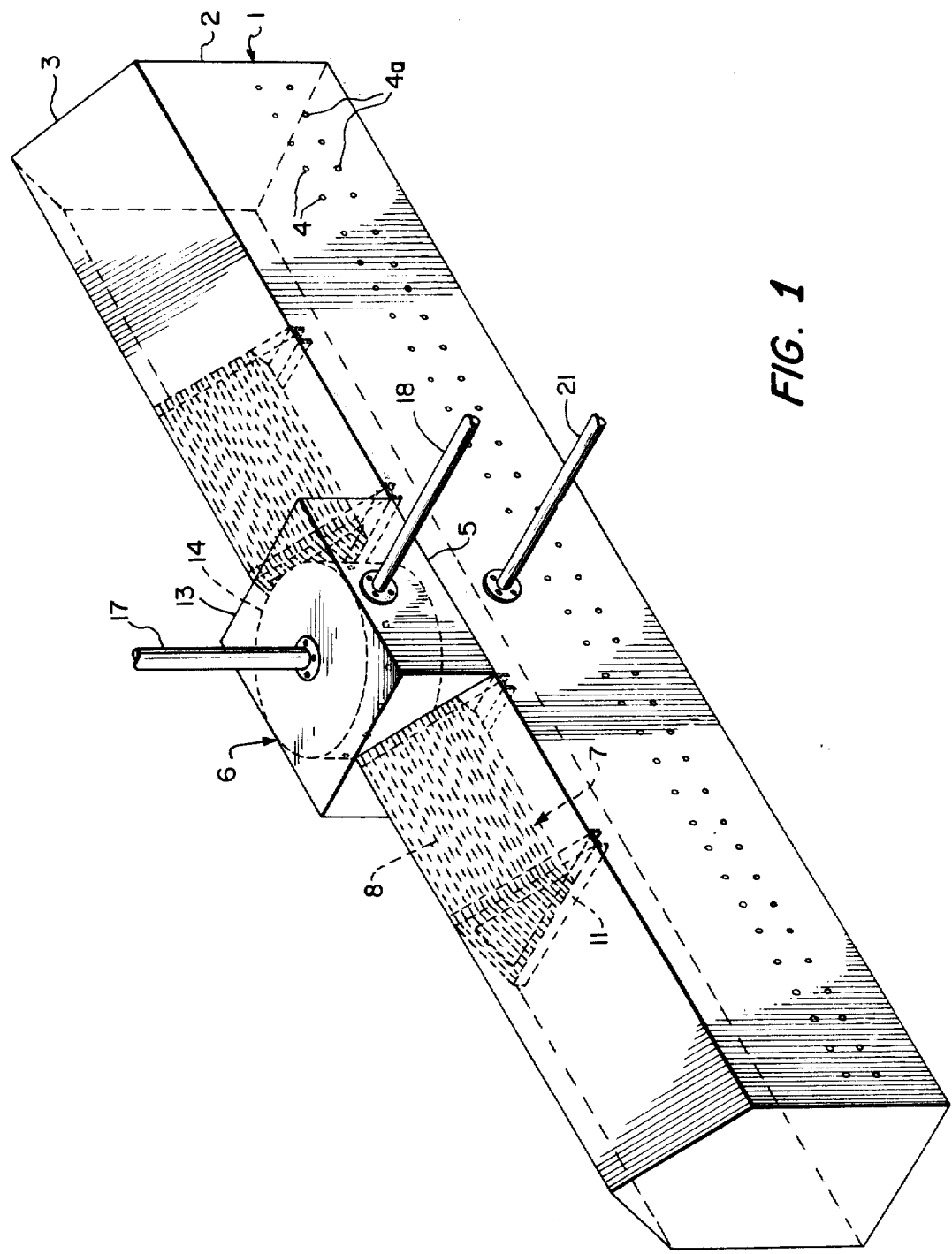
FIG. 1 is an isometric representation, partly schematic, of the distributor-degasser of this invention.

FIG. 1 illustrates the distributor-degasser of the present invention. The distributor-degasser consists of a horizontally elongated inverted trough 1 having a lower portion 2 of rectangular cross-section and an upper peaked portion 3, i.e., a portion having a triangular cross-section. The lower rectangular portion has orifices 4 and 4a along its sides, such orifices being shown here as extending in two horizontal rows on each side of the trough, although other configurations may be employed. The peaked portion extends along the entire length of the rectangular portion except for a central portion 5, where the rectangular portion is surmounted by a demisting section 6. There is no barrier between the rectangular portion 2 and the peaked portion 3 or between the rectangular portion and the demisting section 6. On each side of the demisting section is a defoaming section 7 positioned in the peaked portion 3 immediately adjacent to the demisting section and without any barrier between the sections. As shown, the defoaming sections have a generally triangular cross-section adapted to fit closely into the peaked portion.

Figure 3:
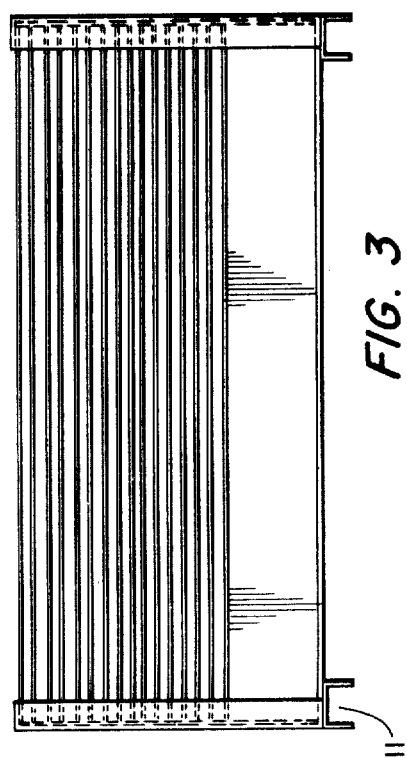
FIGS. 2 and 3 are end and side views, respectively, of a defoamer section of the distributor-degasser of this invention.
Figure 2:
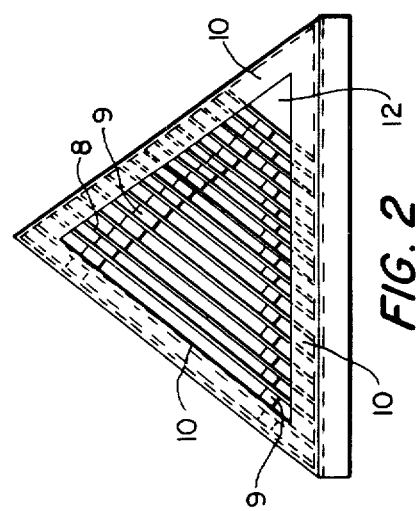

Referring to FIGS. 2 and 3, as well as FIG. 1, each defoaming section consists of a series of inclined plates 8 set on about 45° or at the same angle as a side of the peaked portion 3. The plates 8 are suitably spaced about ½ inch apart, the spacing being maintained by suitable spacers 9. The plates may suitably be encased by triangular frames 10 constructed of angle iron, and supported in the peaked portion at each end by lengths of channel iron 11 attached to the sides of the rectangular portion. All the plates 8 are rectangular in shape, of a uniform length and of whatever width is required to fit into the triangular frames 10. The plates may suitably be made of 3/16 inch thick metal. As shown, there are no plates in the corner portion 12 of the triangular frames due to the difficulty of placing plates of the required small width in position. Any open corner portion 12 must be sealed by suitable means, not shown, to facilitate fabrication.

Figure 5:
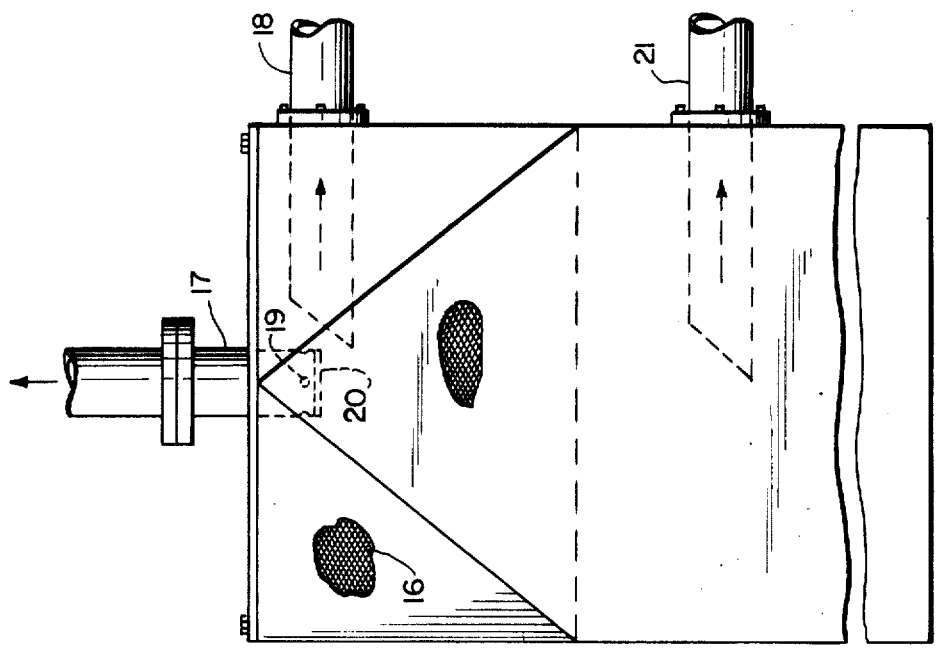
FIGS. 4 and 5 are side and end views, respectively, of the central portion of the distributor-degasser of this invention, showing the demister section.
Figure 4:
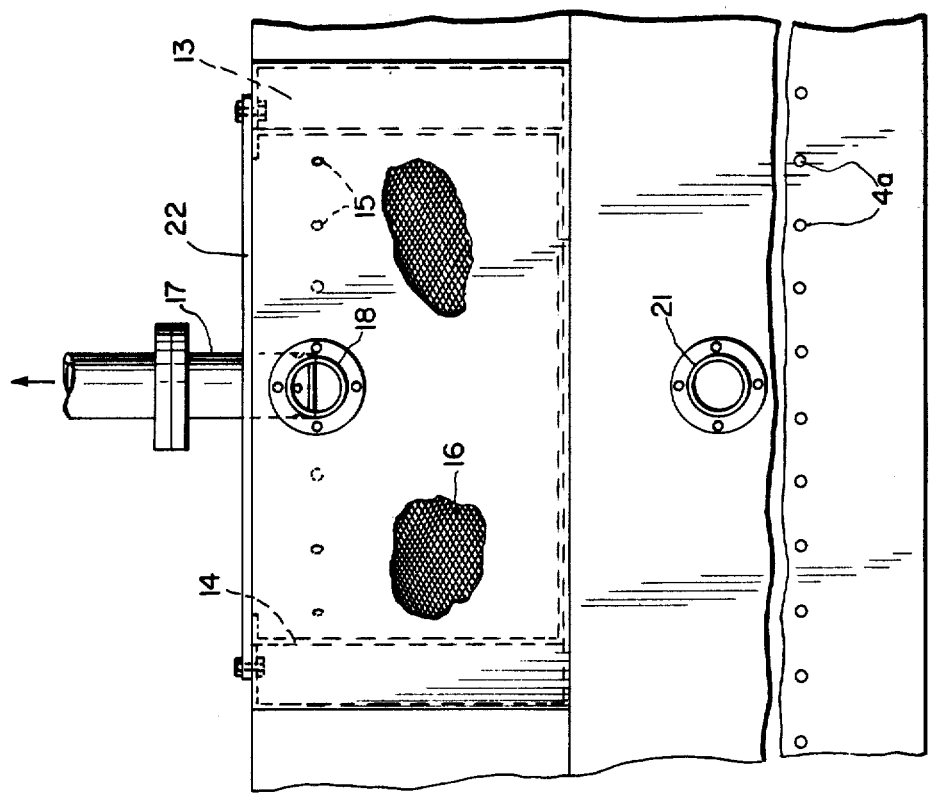

Referring to FIGS. 4 and 5 as well as FIG. 1, the demister section 6, as shown, is in the form of an enclosed box 13, provided with a piece of large diameter pipe 14 vertically and centrally positioned in the box. A series of orifices 15 is provided around the upper portion of the pipe 14. The pipe 14 is filled with packing material 16, suitably of wire mesh, as shown.

Figure 6:
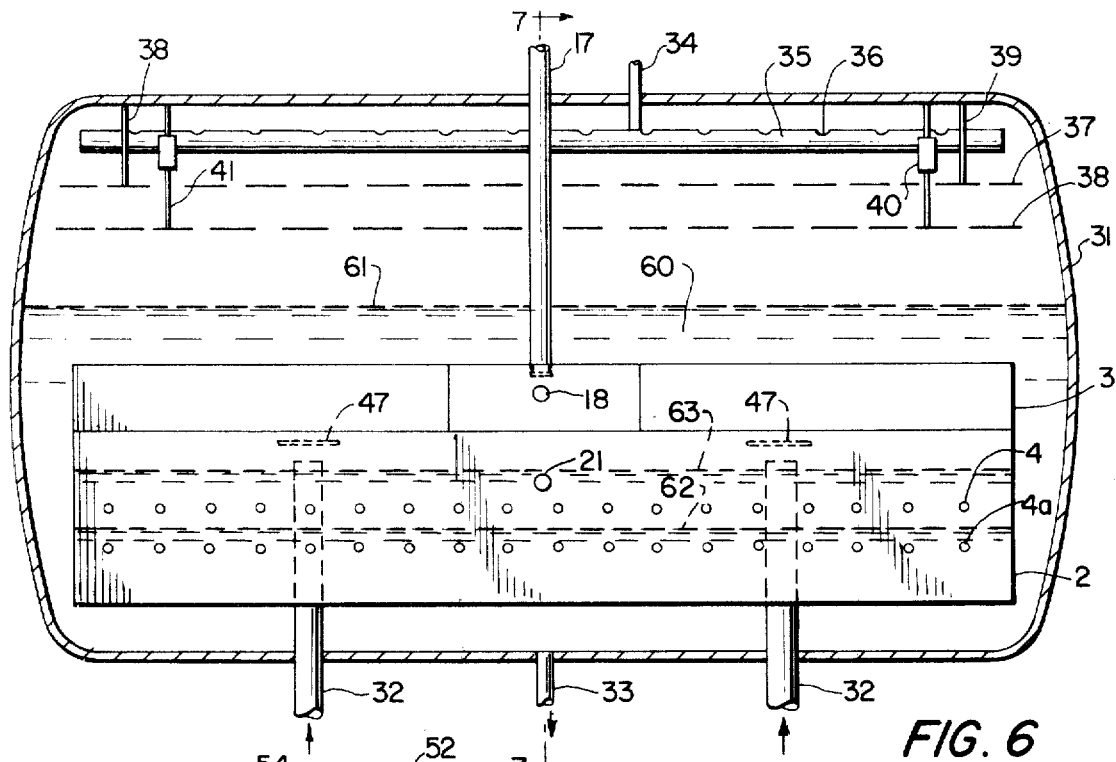
FIG. 6 is a schematic longitudinal section of a separator of this invention employing the distributor-degasser of this invention.
Figure 7:
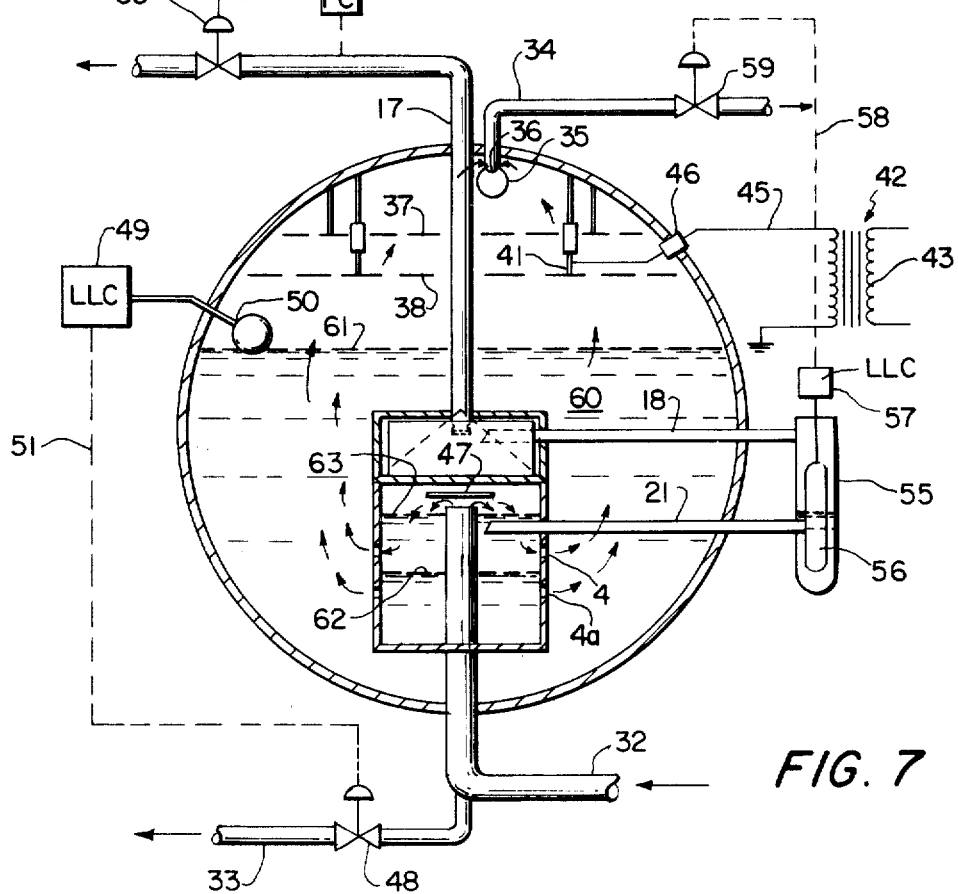
FIG. 7 is a schematic transverse section taken along plane 7—7 of FIG. 6.

Referring to FIGS. 6 and 7 as well as FIGS. 1, 4 and 5, demister section 6 is provided with two outlet conduits 17 and 18. Outlet conduit 17 serves as a gas outlet conduit and is positioned within the upper portion of pipe 14 concentric with the sides thereof and extends vertically through the top of demister section 6. The bottom of conduit 17 is capped and slots or holes 19 are provided in its sides adjacent to the cap 20. Outlet conduit 18 is likewise positioned within the upper portion of pipe 14, but extends horizontally through the front of demister section 6, i.e., a side not adjacent to a defoaming section 7.

Another conduit 21, similar to conduit 18, is located in the rectangular lower portion 2 of the distributor-degasser, below the demister section 6. Conduit 21 extends horizontally through a side wall of the distributor-degasser.

An inspection plate 22 is provided on top of the demister box 13 for the purpose of inspecting and replacing packing 16 if and when necessary.

Referring more specifically to FIGS. 6 and 7, the distributor-degasser is shown positioned in an electrostatic separator. The distributor-degasser is supported in the lower portion of the separator by conventional means such as legs, cross bars, etc., not shown. The electrostatic separator includes a horizontally elongated generally cylindrical vessel 31, which suitably may have a diameter of about 8 to 14 feet. Lengths of about 25 and 49 feet and as much as 133 feet are suitable with a 12 foot diameter vessel. Vessel 31 carries emulsion inlet conduits 32, an aqueous material outlet conduit 33 and an oil outlet conduit 34. Emulsion inlet conduits 32 lead to and are in hydraulic communication with the part of the rectangular portion 2 of the distributor-degasser which is above the level of orifice 4. Two inlet conduits 32 are shown, one on each side of the demister section 6. However, a single inlet conduit may alternatively be employed. Inlet conduits 32 preferably rise vertically inside the rectangular portion 2 of the inverted trough 1. Preferably, a suitably supported horizontal splash plate 47 is positioned a short distance above the mouth of each inlet conduit 32. Aqueous material outlet conduit 33 is provided with a motor valve 48. Vessel 31 is provided with a liquid level control unit 49, which senses the level of the oil-water interface by means of a float 50, and delivers an actuating signal through interconnection 51 to motor valve 48 in response to changes in that level. Oil outlet conduit 34 is connected to and is in hydraulic communication with an outlet collector 35, which may include one or more pipes having rows of orifices 36, horizontally disposed in the upper portion of vessel 31. The outlet collector is preferably supported by steel straps, not shown, welded to the walls of vessel 31 and to the collector, but cross bars or other conventional means of support may be employed.

A pair of horizontally disposed planar electrodes 37 and 38, in vertically spaced relationship, are provided in the upper portion of vessel 1 and extend substantially across the entire cross-section of vessel 1, but spaced apart from the vessel walls. Upper electrode 37 is supported by conductive rods 39 attached to the top of vessel 31, which serve to ground that electrode. Lower electrode 38 is supported by insulators 40 and rods 41 also attached to the top of the vessel. Other conventional means of support and grounding may be employed. The electrodes are preferably permeable, as indicated, for example, they may be in the form of a grid of metal rods or pipes, suitably of a structure similar to that shown in U.S. Pat. No. 2,880,158 to Delber W. Turner.

Lower electrode 38, as shown, is energized from a high voltage external power source 42 which may suitably consist of a transformer 43. The secondary winding of the transformer is grounded at one terminal and the other terminal is connected via conductor 45 through an inlet bushing 46 in the wall of vessel 31 to a supporting rod 41 of electrode 38. It is also contemplated and within the scope of this invention that electrodes 37 and 38 both be energized.

A potential difference of about 15,000 to 33,000 volts may suitably be maintained between electrodes 37 and 38.

Gas outlet conduit 17 extends vertically from demister section 6 to the top of vessel 31. Collector means 35 and electrodes 37 and 38 are adapted to allow an unobstructed path for gas outlet conduit 17. Gas outlet conduit 17 is provided with a pressure control unit 52 and a pressure relief valve 53 which is responsive to the control unit via interconnection 54.

Conduit 18 extends horizontally from the demister section 13 of the distributor-degasser through the wall of vessel 31 to a float chamber 55 provided with a float 56 which is adapted to activate a gas-emulsion interface level control unit 57. Similarly conduit 21 extends horizontally from the rectangular portion 2 of the distributor-degasser through the wall of vessel 31 to the float chamber 55. Level control unit 57 delivers an actuating signal through an interconnection 58 to a motor valve 59, which controls the flow through oil outlet conduit 34 in response to changes in the gas-emulsion interface level in float chamber 55, which is the same as that in the distributor-degasser.

In operation, the emulsion to be treated, e.g., raw oil, is brought to the desired temperature by any suitable procedure, such as by heat exchange with another stream. The desired temperature will depend on the specific gravity and type of feed. However, in many cases of crude oil, temperatures between 100° and 350°

F., with about 200° being optimum, are used. The pressure must be sufficient to keep the oil and water mixture liquid at the operating temperature. A small amount, for example, 1 pint per 1,000 barrels of oil, of a liquid demulsifier, e.g., a Tretolite DS series demulsifier, is optionally added to the oil processed.

As shown, crude oil containing gases and a dispersed aqueous phase is charged by conduits 32 into the gas layer above the gas-emulsion interface 63 in the rectangular section 2 of the distributor-degasser. Gases separated from the oil rise into the peaked portion 3 and then flow from each side towards the defoaming sections 7. Any crude oil droplets collecting on the inclined plates 8 gravitate down and off the plates into the rectangular section 2. The gases pass into the demisting section 6 where additional liquid collects on the wire mesh packing 16 and also gravitates downward. The gases then pass into the conduit 17 by way of orifices 19. Cap 20 serves to prevent gases from entering conduit 17 from below, thus ensuring that gases are taken only from the top part of the demister and hinder any tendency toward channeling of the gas flow directly up to the conduit 17. The gases exit from the demisting section and the treating apparatus via conduit 17.

The degassed oil leaves the distributor-degasser via orifices 4 and rises through the body of water 60 in the treater, then through oil-water interface 61, towards electrodes 37 and 38, and through the electrical field generated by these electrodes. This field is of sufficient intensity to coalesce the dispersed water. Water which has thus been thrown out of emulsion falls toward the bottom of vessel 31, merging with body of water 60, and is withdrawn through water outlet conduit 33. The dehydrated oil rises toward and is taken up by outlet collector 35 and removed from the treater by means of conduit 34.

The oil-water interface 61 is maintained at a predetermined level below electrode 38 by motor valve 48, which regulates the flow through water outlet conduit 33 in response to a signal from liquid level control unit 49. Similarly, the gas-emulsion interface 63 is maintained at a predetermined level above splash plate 47 and conduit 21 by motor valve 59 which regulates the oil effluent flow through conduit 34 in response to a signal from liquid level control unit 59.

Under normal operating conditions, only the upper row of orifices 4 distributes the emulsion, the lower row of orifices 4a being submerged in the body of water 60 and thus inactive. However, when a surge of flow occurs or the rate is increased, there is a need for more head in the distributor-degasser, which depresses emulsion-water interface 62 to narrow orifices 4a, which then also distribute emulsion. An automatic control for increased flow is thus achieved.

It is not necessary that the treating vessel be horizontally elongated, as shown above, the use of spherical or vertically elongated vessels being also contemplated and within the scope of the present invention.

It will be apparent from the aforegoing description that the invention is not limited to a particular shape of vessel, electrode system, electrical circuitry, voltage or voltage gradient employed, number and arrangement of orifices in the distributor (number of rows, etc.), type of collectors, level control means, number and arrangement of conduits, process conditions employed, etc.

Many embodiments and variations of form and other modifications are contemplated as long as they fall within the broad scope of the appended claims. Moreover, although the apparatus has been described with respect to the treatment of a petroleum oil emulsion, it will be apparent that it is not limited to the treatment of such emulsions, the term, "oil-continuous emulsion", being intended to encompass emulsions or dispersions wherein any water-insoluble organic liquid is the continuous phase, and the term, "water", being intended to encompass any aqueous material.

I claim:

1. A combined distributor-degasser for a dehydrating and degassing apparatus, said distributor-degasser comprising:
   (a) a horizontally elongated inverted trough including a lower portion having orifices along its sides and an upper peaked portion having a central upwardly directed opening;
   (b) demister means mounted in said central opening and communicating with said trough;
   (c) defoamer means in the peaked portion of said inverted trough on each side of said demister means, said defoamer means communicating with said demister means;
   (d) means associated with said trough for communicating with liquid-gas interface level control means; and
   (e) gas outlet means in said demister means.

2. An apparatus for dehydrating and degassing oil-continuous emulsions containing gases and a dispersed aqueous phase, said apparatus comprising a treating vessel provided with emulsion inlet means and water, gas and treated oil outlet means, and being further provided in its lower portion with the distributor-degasser of claim 1, said vessel emulsion inlet means communicating with the lower portion of said inverted trough, above said orifices, of said distributor-degasser and said vessel gas outlet means communicating with said demister means.

3. The apparatus of claim 2 wherein said treating vessel is provided also with an electrode system adapted to produce an electric treating field, and conductive means associated therewith.

4. The apparatus of claim 3 wherein said treating vessel is in the form of a horizontally elongated cylinder and said treated oil outlet includes collector means positioned in the upper part of said treating vessel.

5. The apparatus of claim 3 wherein said electrode system is positioned horizontally in said treating vessel and extends across substantially the entire horizontal cross-section thereof.

6. The apparatus of claim 5 wherein the distributor-degasser is positioned below said electrode system and the said treating vessel is provided also with means for controlling the level of aqueous material therein at a position intermediate said distributor-degasser and said electrode system.

7. The apparatus of claim 5 wherein said electrode system comprises two permeable electrodes in vertically spaced relationship.

8. The apparatus of claim 7 wherein the upper of said electrode is grounded and the lower is adapted to be energized.

* * * * *